US006851310B2

United States Patent
Nakamura et al.

(10) Patent No.: US 6,851,310 B2
(45) Date of Patent: Feb. 8, 2005

(54) FLOWMETER (75) Inventors: Toshimi Nakamura, Ageo (JP);
Kenichi Hiraizumi, Ageo (JP); Atsushi Koike, Ageo (JP); Kiyoshi Yamagishi, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 10/451,831

(22) PCT Filed: Dec. 25, 2001

(86) PCT No.: PCT/JP01/11372

§ 371 (c)(1),
(2), (4) Date: Jun. 27, 2003

(87) PCT Pub. No.: WO02/054021

PCT Pub. Date: Jul. 11, 2002

(65) Prior Publication Data

US 2004/0055373 A1 Mar. 25, 2004

(30) Foreign Application Priority Data

Dec. 27, 2000 (JP) ........................ 2000-398478

(51) Int. Cl.[7] ................................. G01F 1/68
(52) U.S. Cl. .................................. 73/204.22
(58) Field of Search .......................... 73/204.22, 202.5, 73/204.11, 204.21, 204.25, 204.27

(56) References Cited

U.S. PATENT DOCUMENTS 6,272,920 B1 * 8/2001 Tank et al. .............. 73/204.22
6,510,735 B2 * 1/2003 Igarashi et al. .......... 73/204.22
6,612,167 B2 * 9/2003 Kamiya ................... 73/204.22

FOREIGN PATENT DOCUMENTS

| JP | 2-195941 A | 8/1990 |
| JP | 6-294672 A | 10/1994 |
| JP | 11-118566 A | 4/1999 |

* cited by examiner

Primary Examiner—Edward Lefkowitz
Assistant Examiner—Jewel V. Thompson
(74) Attorney, Agent, or Firm—Frommer Lawrence & Haug LLP; Ronald R. Santucci (57) ABSTRACT An outlet port in the upper end of a fluid flow passageway vertically formed in a flow rate measuring section (8) disposed in a fluid storage recess (23) communicating with a fluid inlet pipe through an opening (21a) communicates with a fluid outlet pipe (22) through an opening (22a). The heat type flow rate sensor (10) disposed in the flow rate measuring section (8) has a fin plate projecting into the fluid flow passageway through a sensor mount hole (8c). The flow rate measuring section (8) is formed with an auxiliary flow passageway for leading the fluid within the fluid storage recess (23) to the inlet port (811) in the lower end of the fluid flow passageway, the auxiliary flow passageway extending in parallel with the fluid flow passageway and having fluid introducing ports (822, 823, 824) and a fluid delivering port (821) leading to the fluid flow passageway. The flow rate measuring section (8) is equipped with a bottom plate (8d) forming a communication passageway extending from the fluid delivering port (821) to the fluid flow passageway inlet port (811).

6 Claims, 10 Drawing Sheets

FLOWMETER

This application is a 371 of PCT/JP01/11372 filed on Dec. 25, 2001, published on Jul. 11, 2002 under publication number WO 02/054021 A1 and claims priority benefits of Japanese Patent Application No. 2000-398478 filed Dec. 27, 2000.

TECHNICAL FIELD

The present invention relates to a fluid flow rate sensing technique, particularly to a flowmeter for measuring a momentary flow rate or integrated flow rate of a fluid which flows in a pipe.

BACKGROUND ART

A flowmeter has been used in sensing flow rates of fluids such as kerosene, water, and gas consumed by households or companies. As the flowmeter, a flowmeter using a heat type (especially an indirectly heated type) flow rate sensor, whose cost can easily be reduced, has been used.

For the indirectly heated type flow rate sensor, a sensor has been used including a sensor chip constituted by using a thin-film technique on a substrate to stack a thin-film heating material onto a thin-film temperature sensing material via an insulating layer so that heat can be conducted between the sensor chip and fluid in a pipe (including a fluid flow passageway connected to an external pipe and disposed in the flowmeter). When the heating material is energized, the temperature sensing material is heated to change electric characteristics of the temperature sensing material such as a value of electric resistance. This change of the electric resistance value (based on a temperature rise of the temperature sensing material) responds to a flow rate (flow velocity) of the fluid which flows in the pipe. This is because a part of a heating value of the heating material is transmitted into the fluid, an amount of heat diffused into the fluid changes in accordance with the flow rate (flow velocity) of the fluid, the amount of heat supplied to the temperature sensing material accordingly changes, and the electric resistance value of the temperature sensing material changes. The change of the electric resistance value of the temperature sensing material also differs with temperature of the fluid. Therefore, another method comprises: incorporating a temperature sensing element for compensating for the temperature into an electric circuit for measuring the change of the electric resistance value of the temperature sensing material so as to minimize the change of a measured flow rate value by the temperature of the fluid.

This indirectly heated type flow rate sensor using a thin-film element is described, for example, in JP(A)-11-118566. In this flow rate sensor, the electric circuit including a bridge circuit is used to obtain an electric output corresponding to the flow rate of the fluid.

In the above-described flowmeter, a fin plate for heat exchange between the sensor chip and the fluid is projected into the fluid flow passageway. In the vicinity of the flow rate sensor, an electric circuit portion including a circuit substrate for flow rate calculation, a display portion, a communication circuit connection portion, and the like are disposed. A function portion of the flowmeter including these portions is entirely contained in a housing.

In the related-art flowmeter, a path for fluid circulation in the housing is not simply linear, and is formed in a bent shape in many cases. This is because a filter for removing foreign particles in the fluid is disposed in the circulation path, or the circulation path is formed so as to alleviate an influence of rapid temperature change of the inflowing fluid and to relatively moderate the temperature change of the flow rate sensor. On the other hand, the temperature in the housing is easily influenced by outside air temperature or direct sunlight. Therefore, there are problems that nonuniformity of temperature distribution by a position in the housing including the circulated fluid becomes remarkable and that accuracy of flow rate sensing easily drops.

DISCLOSURE OF THE INVENTION

Therefore, an object of the present invention is to provide a heat type flowmeter in which there is little nonuniformity by a position of temperature distribution inside a housing including a circulated fluid and in which there is little accuracy drop of flow rate sensing.

To achieve the above-described object, according to the present invention, there is provided a flowmeter comprising:

a fluid storage portion formed in a housing, the fluid storage portion being connected to a fluid inlet tube formed in the housing; and a flow rate measuring portion which is disposed in the fluid storage portion and in which a fluid flow passageway is formed and an outlet port of the fluid flow passageway is connected to a fluid outlet tube formed in the housing and in which a heat type flow rate sensor is disposed including a fin plate projecting into the fluid flow passageway, wherein an auxiliary flow passageway for leading fluid in the fluid storage portion toward an inlet port of the fluid flow passageway is formed in the flow rate measuring portion, and the auxiliary flow passageway comprises a plurality of fluid introducing ports and a fluid discharging port which is connected to the fluid introducing ports and which is positioned closer to the fluid flow passageway inlet port than to the fluid introducing ports.

In one aspect of the present invention, one of the plurality of fluid introducing ports of the auxiliary flow passageway is constituted of one end opening, the other fluid introducing ports are constituted of side openings, and the fluid discharging port is constituted of the other end opening. In one aspect of the present invention, the fluid flow passageway extends in a vertical direction, the auxiliary flow passageway extends in parallel with the fluid flow passageway, and the fluid flow passageway inlet port is positioned in a lower end of the fluid flow passageway.

In one aspect of the present invention, the fluid storage portion is formed of a recess portion for storage formed in a main body member of the housing and an inner lid member fitted to the recess portion, and the flow rate measuring portion is attached to the inner lid member.

BEST MODE FOR CARRYING OUT THE INVENTION

An embodiment of the present invention will be described hereinafter with reference to the drawings.

Figure 1:
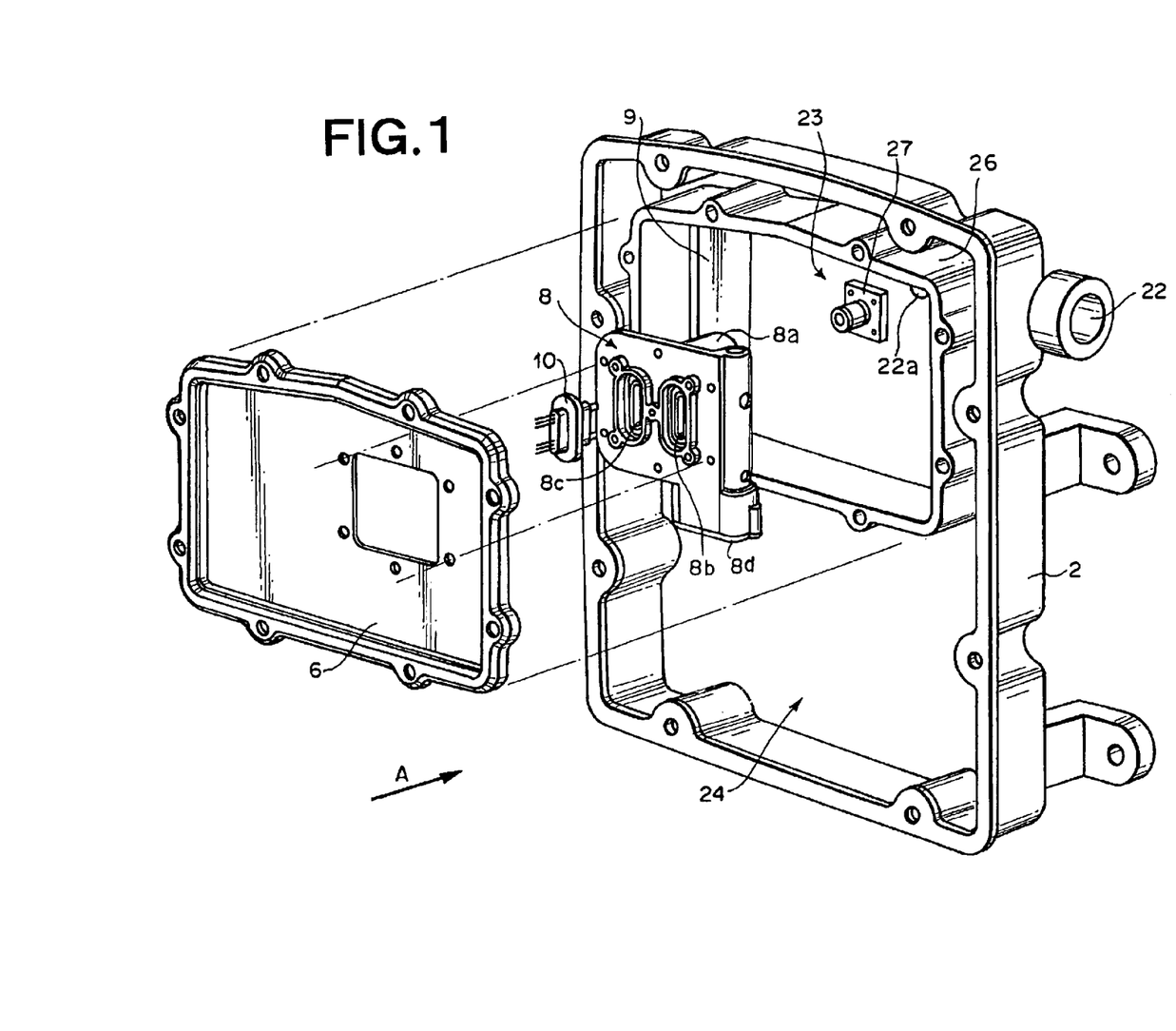
FIG. 1 is an exploded perspective view showing a whole constitution of a flowmeter according to the present invention.

FIG. 1 is a schematic exploded perspective view showing a part of a constitution of one embodiment of a flowmeter according to the present invention. A housing main body member 2 of the flowmeter is die-cast in aluminum or zinc. To the housing main body member 2, an outer lid member (not shown) of die-cast in aluminum or zinc is fitted by screw engagement in a specific direction (direction of arrow A). A fluid outlet tube 22 is formed on one side of a rear surface upper portion of the housing main body member 2, and a fluid inlet tube (not shown) is formed on the other side.

A recess portion 23 for fluid storage portion is formed in an upper half of the housing main body member 2. An outer peripheral surface of a die-cast inner lid member 6 of aluminum or zinc is fitted by screw engagement to an end surface of an inner wall 26 of the recess portion 23 in a direction of arrow A so as to seal the recess portion 23. In the fitting, a rubber seal (cork-mixed rubber seal, and the like) is disposed to prevent the fluid from leaking from the fitted portion. Thus, a fluid storage portion is formed between the housing main body member 2 and the inner lid member 6 to temporarily store and circulate the fluid. In the housing main body member 2, an opening is connected to the fluid inlet tube and opened in the recess portion 23, and a connection opening 22a is connected to the fluid outlet tube 22 and opened in the recess portion 23.

Figure 2:
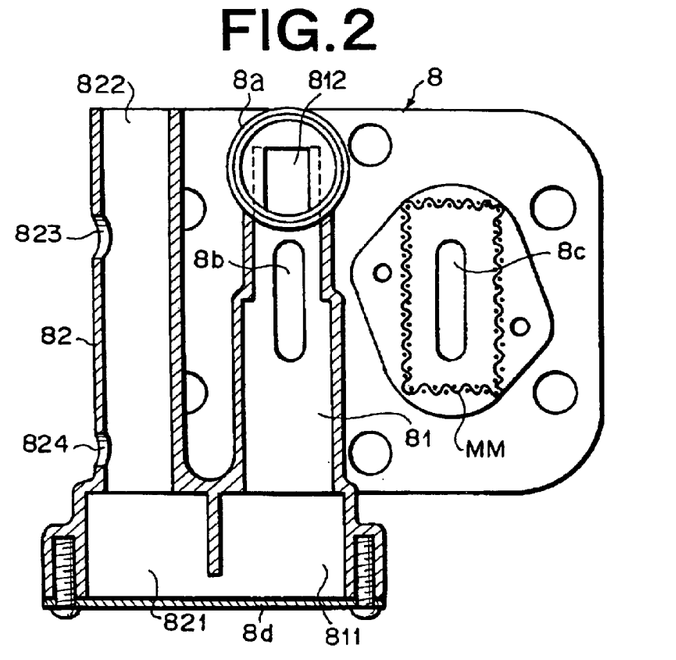
FIG. 2 is a sectional view of a flow rate measuring portion.
Figure 3:
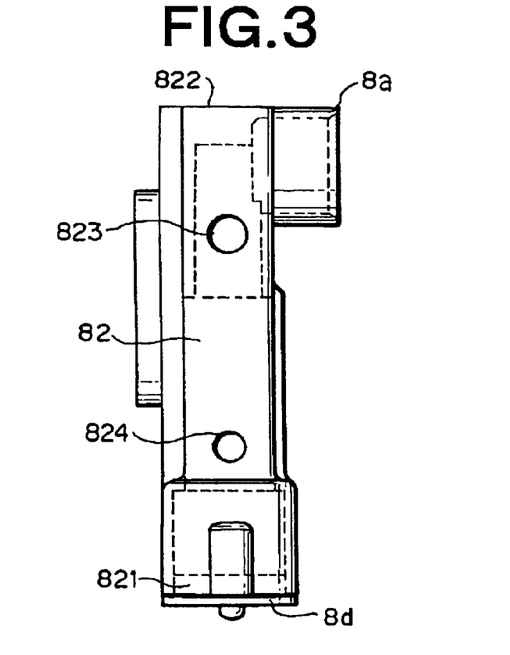
FIG. 3 is a side view of the flow rate measuring portion.

A flow rate measuring portion 8 disposed in the fluid storage portion is attached to the inner lid member 6. FIG. 2 shows a sectional view of the flow rate measuring portion 8, and FIG. 3 shows a side view of the portion. In the flow rate measuring portion 8, a fluid flow passageway 81 is formed to extend in a vertical direction (perpendicular direction). An inlet port 811 of the fluid flow passageway 81 is positioned in a lower part of the flow rate measuring portion 8. A protrusion 8a projecting in the direction of arrow A is attached to an outlet port 812 positioned in an upper part of the fluid flow passageway 81. The inner lid member 6 is fitted to the housing main body member 2 to thereby connect the protrusion 8a to the connection opening 22a on a housing main body member 2 side via a joint member 27. Thus, the fluid flow passageway outlet port 812 of the flow rate measuring portion 8 is connected to the fluid outlet tube 22.

Figure 4:
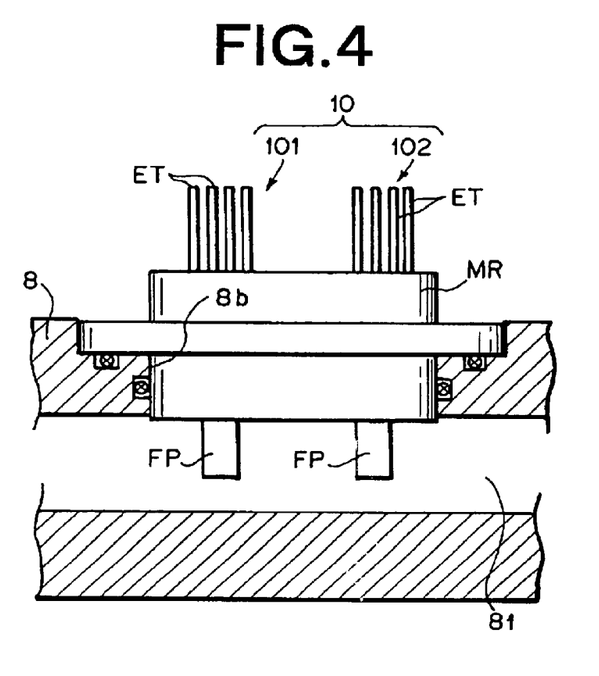
FIG. 4 is a diagram showing an attaching portion of a flow rate sensor.
Figure 5:
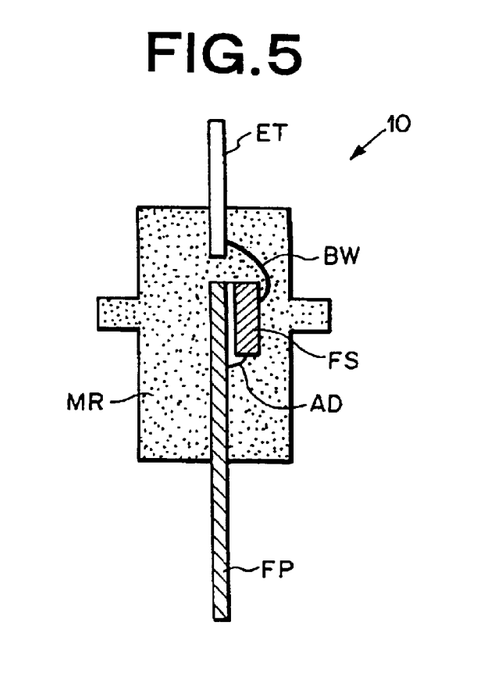
FIG. 5 is a sectional view of the flow rate sensor.

In sensor mount holes 8b, 8c formed in the flow rate measuring portion 8 in the direction of arrow A, heat type flow rate sensors (to which a fluid temperature detecting sensor is attached) 10 are inserted including fin plates which are heat conductive members for heat exchange, respectively (FIG. 1 shows only one heat type flow rate sensor). FIG. 4 shows an attaching portion of the flow rate sensor 10, and FIG. 5 shows a sectional view of the flow rate sensor 10. The flow rate sensor 10 inserted in the sensor mount hole 8b via an O-ring is projected into the fluid flow passageway 81. The flow rate sensor 10 inserted in the sensor mount hole 8c via an O-ring is projected into a fluid storage space.

The flow rate sensor 10 includes a flow rate sensor portion 101 and fluid temperature detecting sensor portion 102. In the flow rate sensor portion 101, as shown in FIG. 5, a fin plate FP is bonded to a flow rate sensing portion FS by a bond material AD satisfactory in heat conductivity, and electrode pads of the flow rate sensing portions FS are connected to external electrode terminals ET by bonding wires BW. The fluid temperature detecting sensor portion 102 can be structured to use a fluid temperature sensing portion instead of the flow rate sensing portion FS in the flow rate sensor portion 101, and includes the corresponding external electrode terminals ET. For these flow rate sensing portion and fluid temperature sensing portion, those described in the above-mentioned JP(A)-11-118566 can be used. The flow rate sensor portion 101 and fluid temperature detecting sensor portion 102 are sealed and united with a common mold resin MR.

As shown in FIG. 2, a wire mesh cover MM for covering the fin plate FP of the flow rate sensor 10 inserted in the sensor mount hole 8c is attached to the flow rate measuring portion 8. The wire mesh cover MM is disposed in such a manner that the fin plate FP of the flow rate sensor 10 may be influenced by fluid circulation based on natural convection but is prevented from being influenced by the fluid circulation caused by fluid supply. This flow rate sensor constitutes a reference flow rate sensing circuit which senses a difference of thermal properties of a fluid to be measured with respect to a reference fluid for use in preparing a calibration curve for use in converting an output value obtained from a measured flow rate sensing circuit including the flow rate sensor 10 inserted in the sensor mount hole 8b to a flow rate value.

As shown in FIG. 1, a fluid circulation path defining member 9 is disposed in the recess portion 23. The fluid circulation path defining member 9 defines a circulation path of the fluid flowing via the opening in the fluid storage portion, and uniformly guides the fluid into a region in which the flow rate measuring portion 8 is disposed through a vertically elongated opening formed between the defining member and the inner lid member 6.

Although not shown, an analog circuit substrate electrically connected to the external electrode terminals ET of the flow rate sensor 10 is attached to a front surface of the inner lid member 6. Although not shown, circuit members such as a digital circuit substrate constituting the flow rate sensing circuit together with the analog circuit substrate, a transformer constituting a power supply circuit portion, and input/output terminal portions with respect to the flowmeter are attached to the outer lid member. Especially, the transformer and input/output terminal portions are disposed in a recess portion 24 for the circuit members formed in a lower half of the housing main body member 2.

As shown in FIGS. 1 to 3, the fluid flow passageway 81 of the flow rate measuring portion 8 extends in the vertical direction (perpendicular direction). In the flow rate measuring portion 8, an auxiliary flow passageway 82 is formed in parallel with the fluid flow passageway 81. The auxiliary flow passageway 82 includes a lower end opening which is a fluid discharging port 821, an upper end opening which is a first fluid introducing port 822, and two side openings positioned in heights different from each other which are second and third fluid introducing ports 823, 824.

The auxiliary flow passageway 82 has a function of: introducing the fluid in the fluid storage portion via the fluid introducing ports 822, 823, 824 and discharging the fluid via the fluid discharging port 821; and guiding the fluid toward the fluid flow passageway inlet port 811 via a communication path constituted with use of a bottom plate 8d. The fluid introducing ports 822, 823, 824 have inner diameters which are different from one another, and the inner diameter of the port having a smaller distance from the fluid discharging port 821 is set to be smaller. Accordingly, the flow rates of the fluids introduced into the auxiliary flow passageway 82 from the different heights can be averaged.

Figure 6:
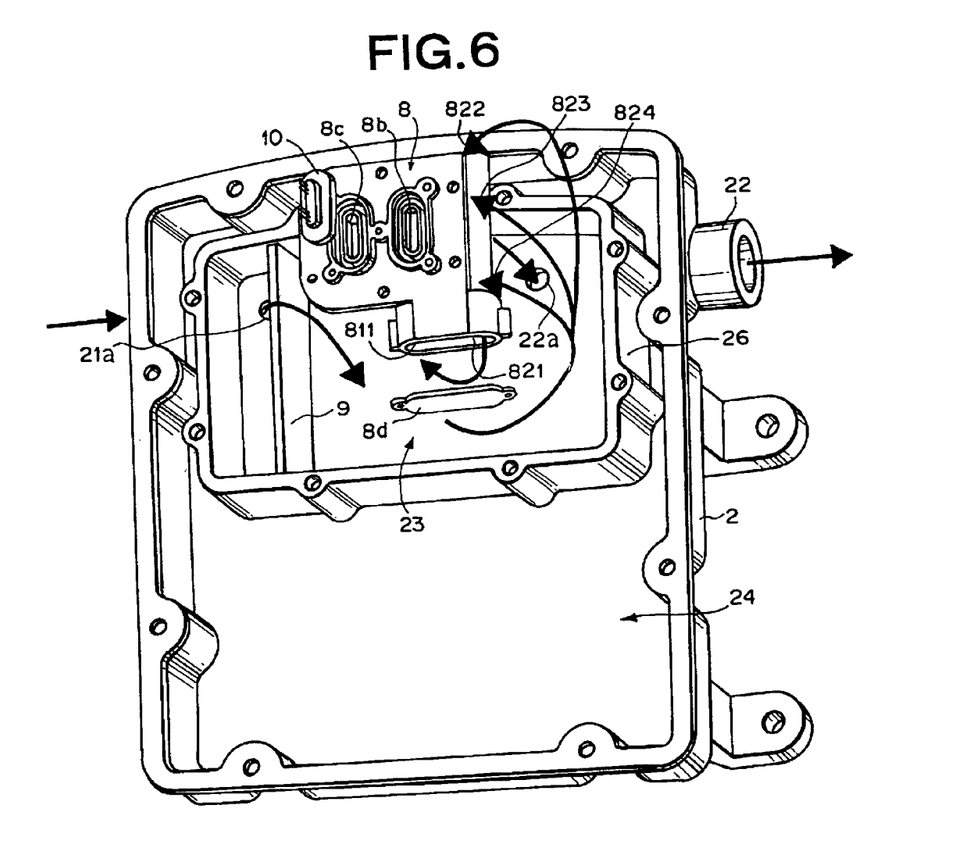
FIG. 6 is an exploded perspective view showing fluid circulation in the flowmeter according to the present invention.

FIG. 6 is an exploded perspective view showing the fluid circulation in the present embodiment. In FIG. 6, circulation directions of the fluid are shown by arrows. The fluid supplied from a fluid supply source (not shown) through piping is supplied into the fluid storage portion from the fluid inlet tube through an opening 21a. The supplied fluid first flows over the circulation path defining member 9 and reaches the region where the flow rate measuring portion 8 is disposed. Subsequently, the fluid is sucked into the fluid flow passageway 81 via the auxiliary flow passageway 82, discharged from the fluid outlet tube 22 through the fluid flow passageway outlet port 812 and the connection opening 22a, and supplied into a fluid requiring apparatus (not shown). Thereafter, when there is a demand for the fluid on a fluid requiring apparatus side, the fluid is supplied into the fluid requiring apparatus from the fluid supply source via the auxiliary flow passageway 82 and fluid flow passageway 81 in the fluid storage portion of the flowmeter.

In the present embodiment, the auxiliary flow passageway 82 is disposed in a position having a distance from the opening 21a, which is larger than that of the connection opening 22a, and the auxiliary flow passageway 82 is disposed adjacent to the inner wall 26 on the right side in the fluid storage portion. Therefore, the flow toward the right inner wall 26 in a horizontal direction, which is averaged concerning a vertical position, is generated in the fluid in the fluid storage portion. Therefore, the temperature distribution in the fluid storage portion including the flow rate measuring portion 8 is sufficiently uniformed, and accuracy of flow rate measurement is enhanced.

Figure 7:
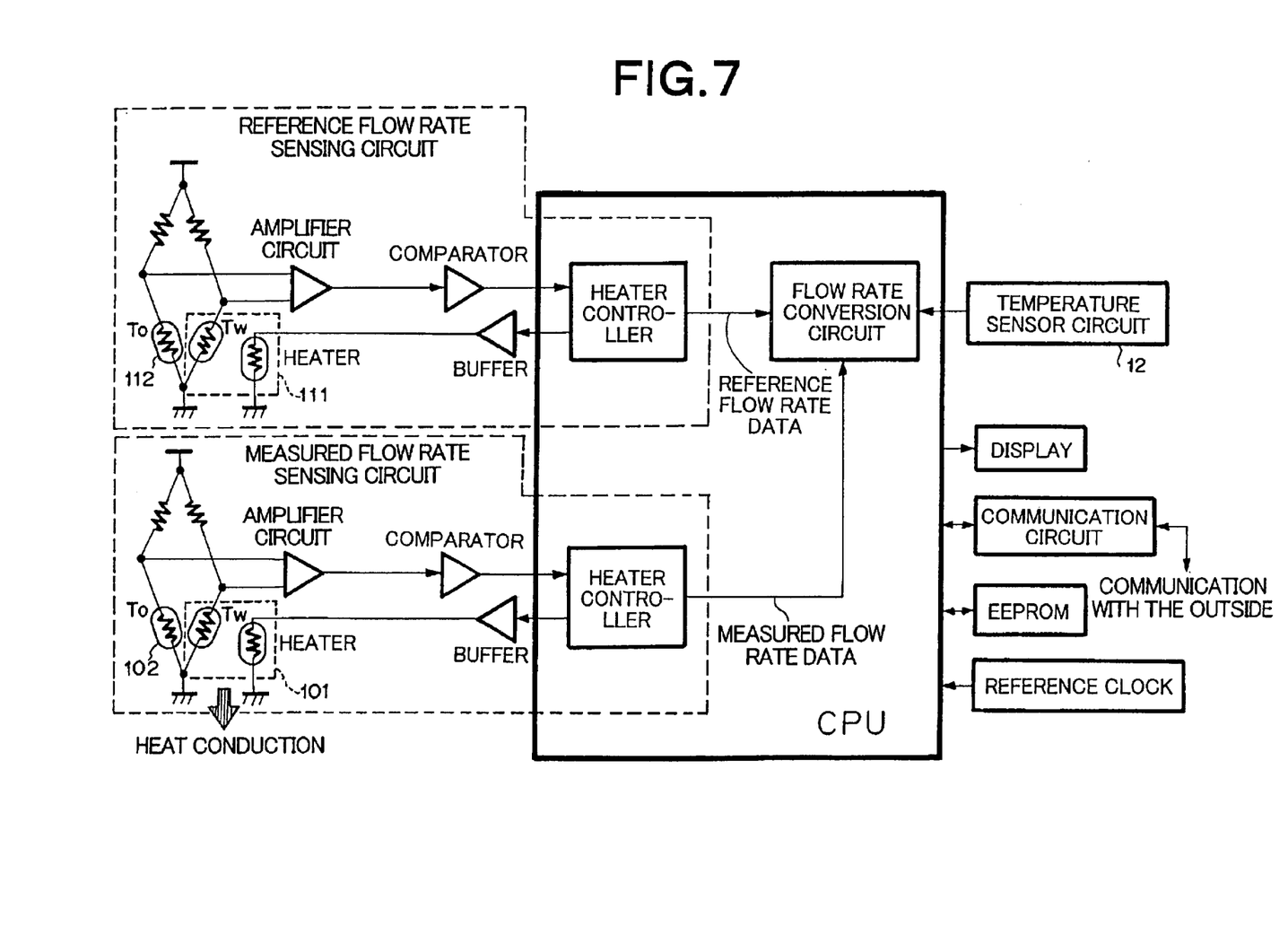
FIG. 7 is a block diagram showing a schematic constitution of an electric circuit portion of the flowmeter according to the present invention.

The fluid flow rate in the fluid flow passageway 81 is measured using the measured flow rate sensing circuit including the flow rate sensor portion 101 and fluid temperature detecting sensor portion 102 as shown in FIG. 7. In FIG. 7, in the flow rate sensor portion 101, a flow rate sensing portion is formed by stacking a heater onto a temperature sensing resistor Tw via an insulating film, and a part of heating value of the heater is conducted to the fluid circulated in the fluid flow passageway 81 via the fin plates FP. The temperature sensing resistor Tw executes temperature sensing while influenced by thermal interaction with the fluid. Two resistors including the temperature sensing resistor Tw and a temperature sensing resistor To of the fluid temperature sensing portion of the fluid temperature detecting sensor portion 102 form a bridge circuit. An output of the bridge circuit is amplified by an amplifier circuit, and compared with a predetermined value by a comparator, and an output of the comparator is inputted into a heater controller. The heater controller controls the heating of the heater of the flow rate sensor portion 101 via a buffer in response to an input signal. This control is performed in such a manner that the temperature sensing resistor Tw of the flow rate sensor portion 101 maintains a predetermined temperature sensing state, that is, an input signal into the heater controller maintains a predetermined value. This control state corresponds to a momentary flow rate, and the data is inputted into a flow rate conversion circuit.

The reference flow rate sensing circuit includes a constitution equal to that of the measured flow rate sensing circuit except that a flow rate sensor portion 111 and fluid temperature detecting sensor portion 112 similar to the flow rate sensor portion 101 and fluid temperature detecting sensor portion 102 are included, and performs similar flow rate sensing. Since the reference flow rate obtained thereby changes in accordance with dynamic viscosity of the fluid to be measured, the flow rate measured by the measured flow rate sensing circuit can be corrected based on an output of the reference flow rate sensing circuit.

A signal indicating the temperature of the analog circuit portion is inputted into the flow rate conversion circuit from a temperature sensor circuit 12 including a temperature sensor (not shown). The flow rate conversion circuit performs operations such as correction in accordance with the analog circuit portion temperature and correction in accordance with the reference flow rate based on measured flow rate data obtained from the measured flow rate sensing circuit, reference flow rate data obtained from the reference flow rate sensing circuit, and analog circuit portion temperature data obtained from the temperature sensor circuit 12. The circuit also performs conversion into a flow rate value using a calibration curve.

A CPU including the above-described heater controller and flow rate conversion circuit is connected to a display portion, communication circuit, EEPROM, and reference clock. The obtained flow rate value is displayed in the display portion, or outputted to the communication circuit for use in communication with the outside.

Next, examples of a flow velocity distribution and temperature distribution in the fluid storage portion at a flow rate of 10 liters/h in the flowmeter of the present invention will be described with reference to FIGS. 8A and 9 to 12. For comparison, with reference to FIGS. 8B and 9 to 12, the flow velocity distribution and temperature distribution in the fluid storage portion at the flow rate of 10 liters/h in a related-art flowmeter will be described.

Figure 8A:
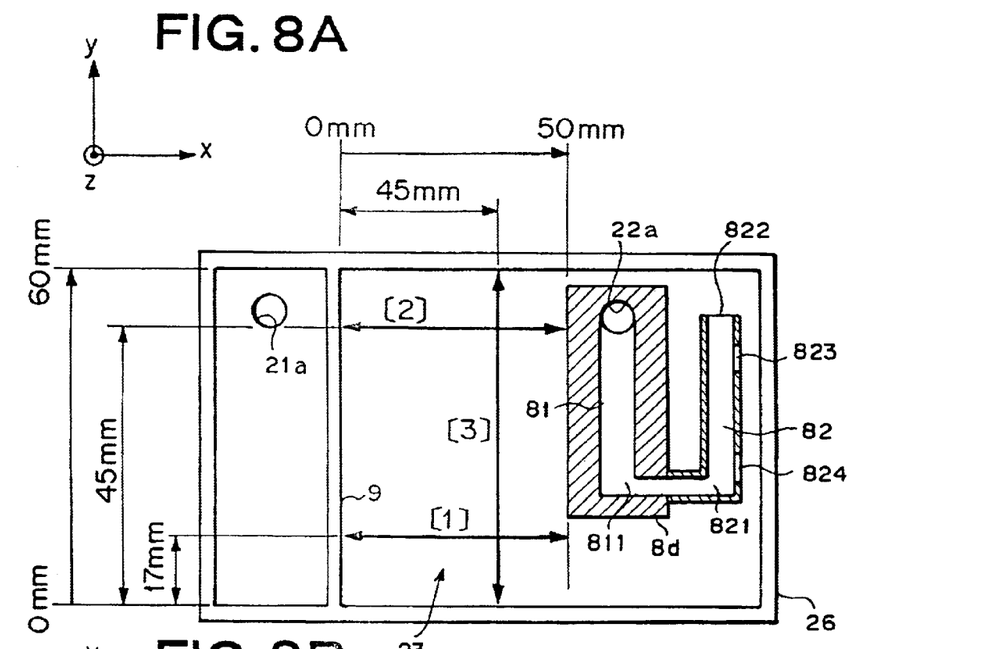
FIG. 8A is a diagram showing measurement ranges of a flow velocity distribution and temperature distribution in a fluid storage portion of the flowmeter according to the present invention.
Figure 8B:
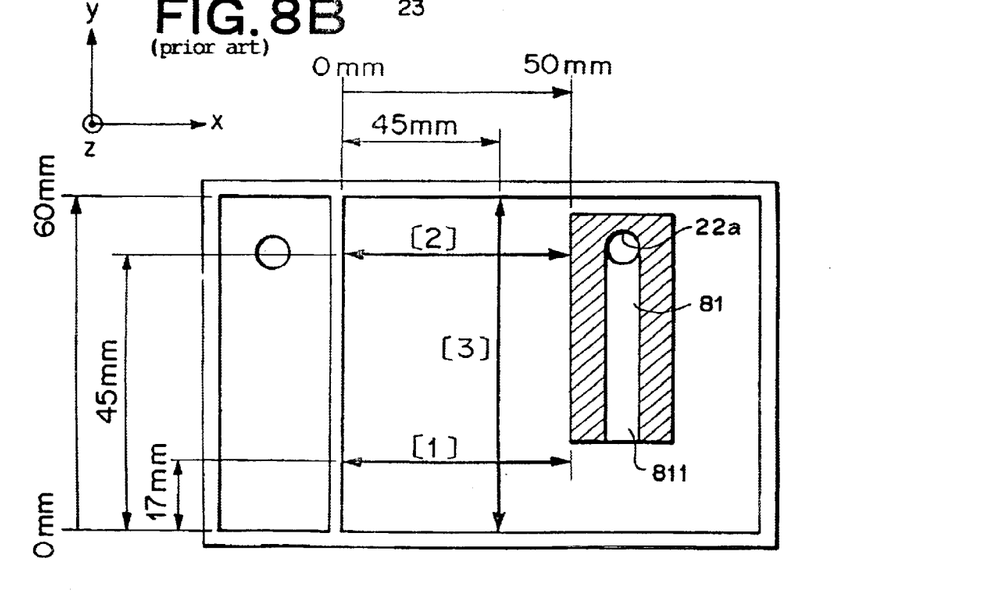
FIG. 8B is a diagram showing the measurement ranges of the flow velocity distribution and temperature distribution in the fluid storage portion of a related-art flowmeter.

FIGS. 8A and 8B show measurement ranges in the fluid storage portion. FIG. 8A shows the portion according to the present invention, and FIG. 8B shows the portion according to the related art. The portion according to the present invention was one described in the embodiment with reference to FIGS. 1 to 7. For the related-art portion, the auxiliary flow passageway 82 according to the present invention was removed, the bottom plate 8d is excluded, and the fluid flow passageway inlet port 811 directly opens into the fluid storage portion. A depth of the recess portion 23 for the fluid storage portion, that is, a width of the fluid storage portion (Z-direction dimension in FIGS. 8A and 8B) was 18 mm, and measurement ranges [1] to [3] were in positions at 9 mm from the bottom of the recess portion 23 in a Z direction.

Figure 9:
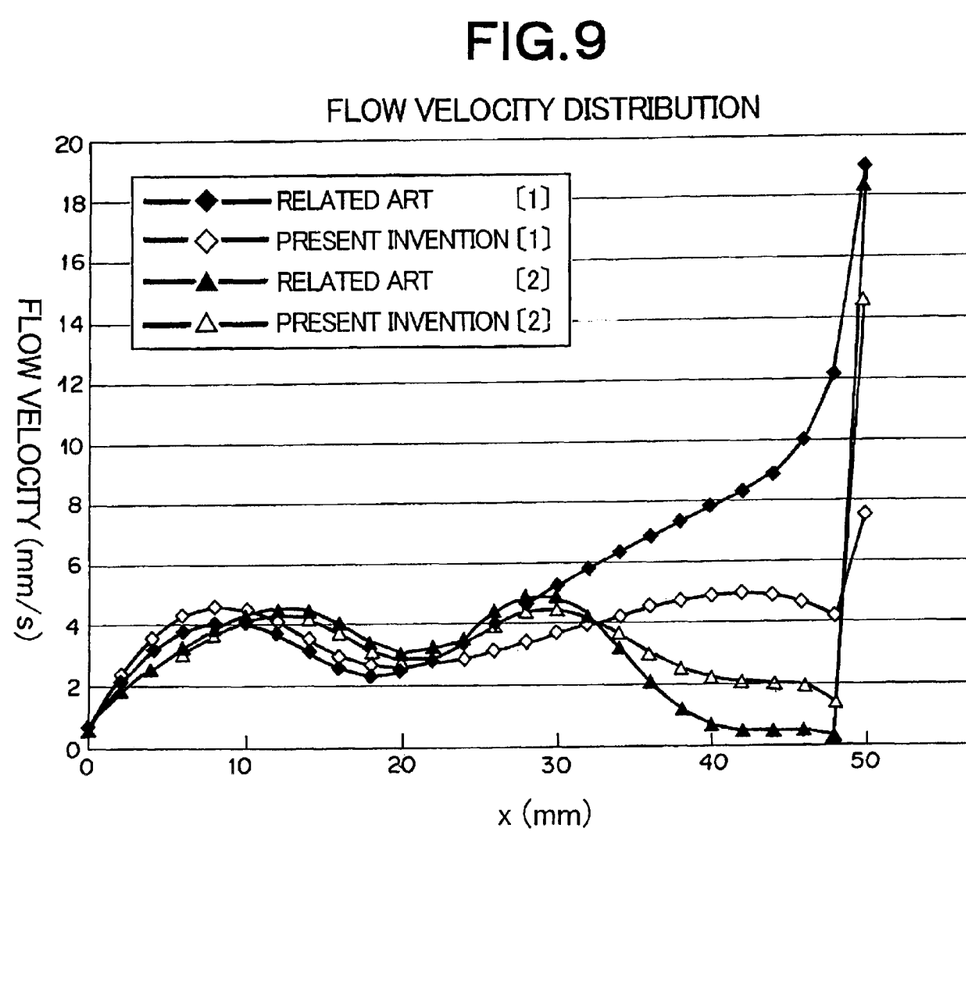
FIG. 9 is a graph showing the flow velocity distribution in the fluid storage portion.
Figure 10:
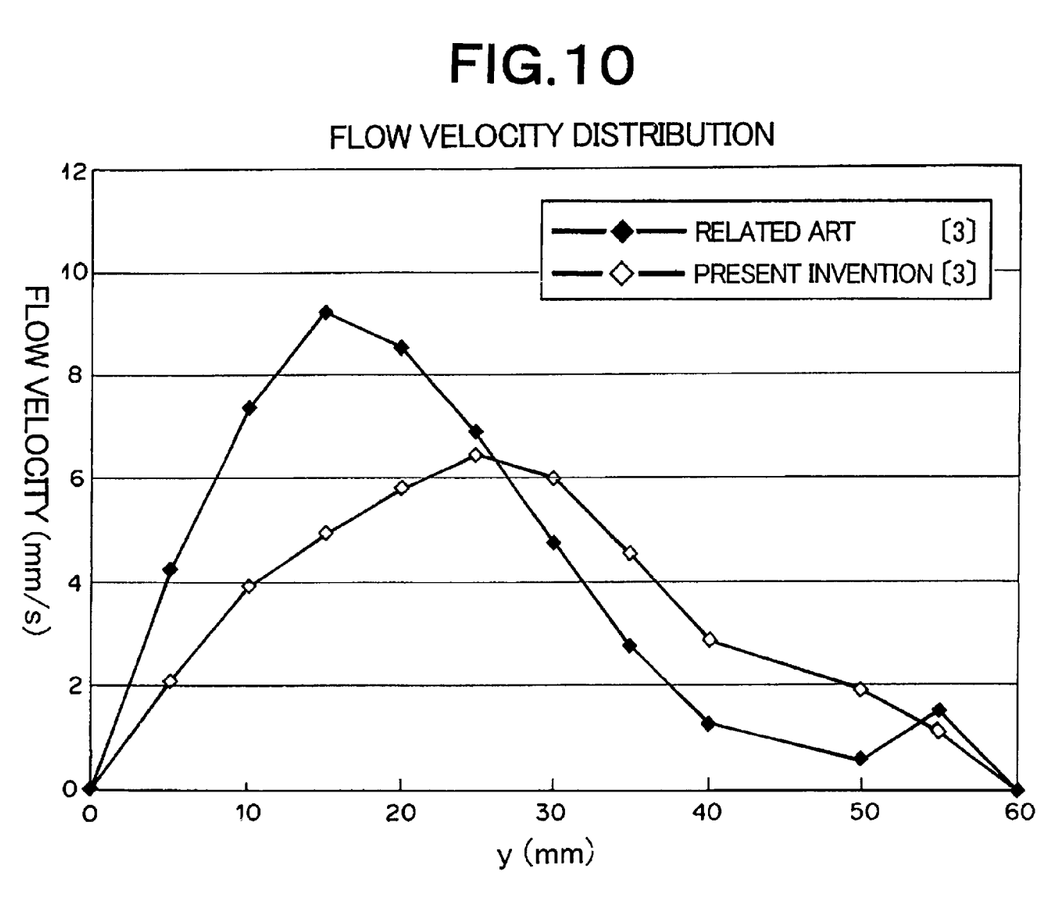
FIG. 10 is a graph showing the flow velocity distribution in the fluid storage portion.

FIG. 9 shows the flow velocity distribution in the measurement ranges [1] and [2], and FIG. 10 shows the flow velocity distribution in the measurement range [3]. In the present invention, dispersion of the flow velocity is less than that of the related art in a broad range in each measurement range. It is also seen that uniformity of the flow velocity over all the measurement ranges is higher than that of the related art.

Figure 11:
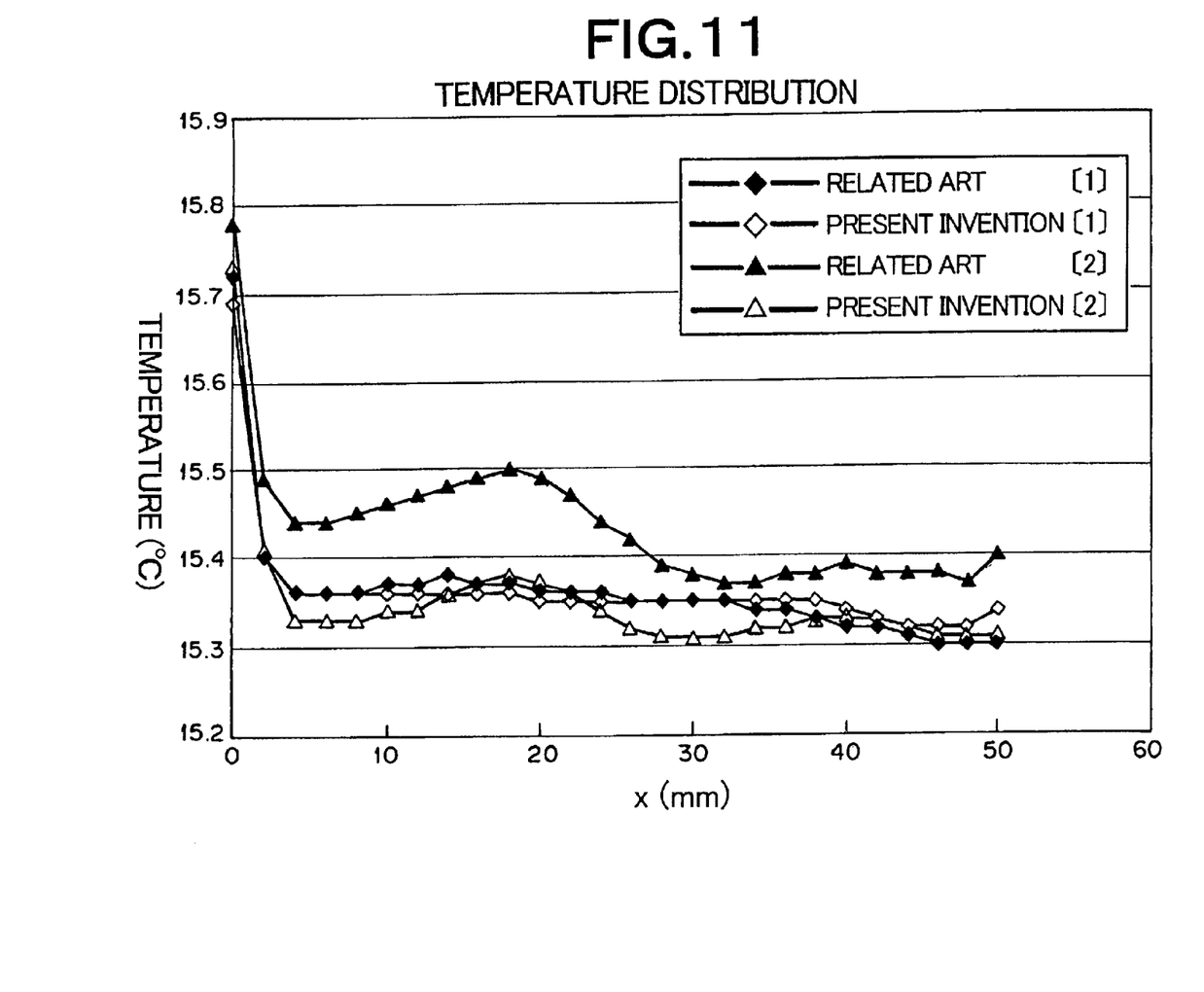
FIG. 11 is a graph showing the temperature distribution in the fluid storage portion.
Figure 12:
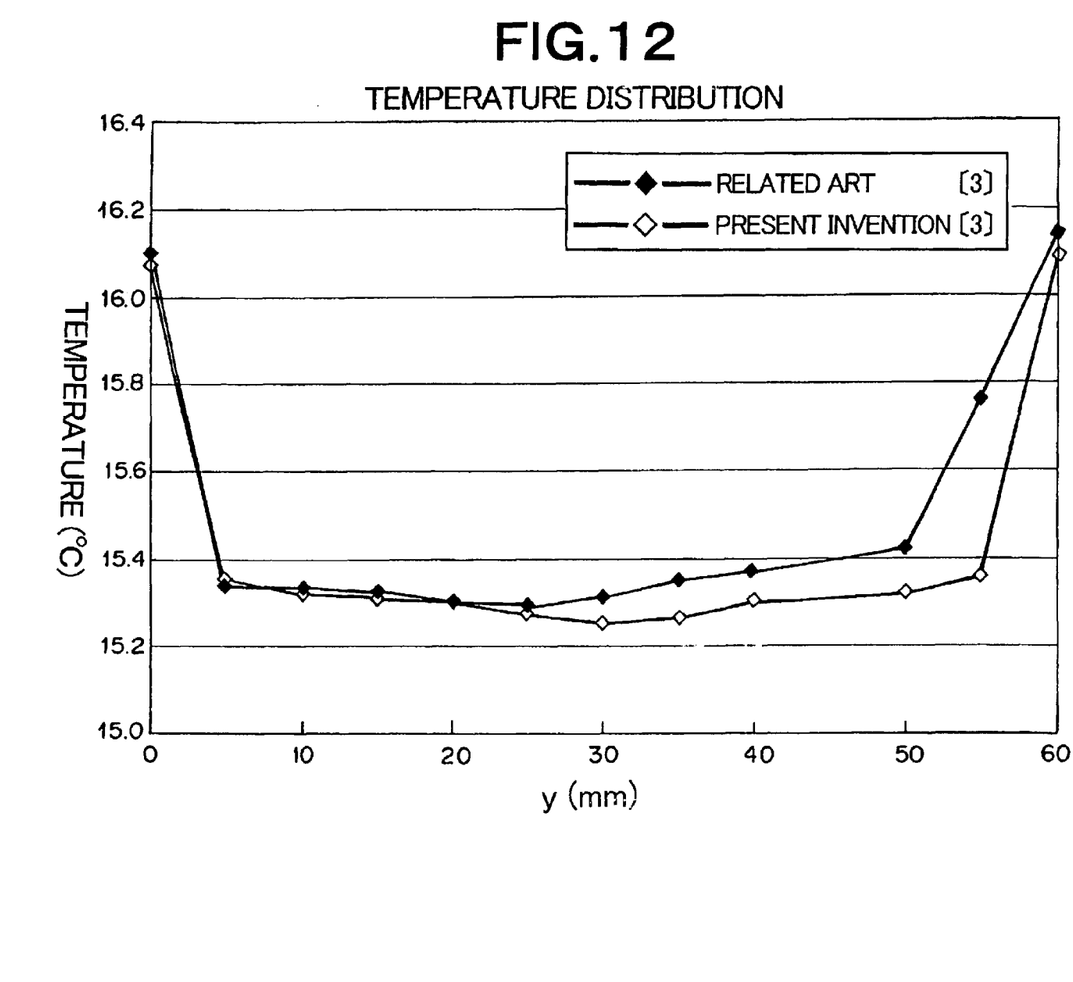
FIG. 12 is a graph showing the temperature distribution in the fluid storage portion.

FIG. 11 shows the temperature distribution in the measurement ranges [1] and [2], and FIG. 12 shows the temperature distribution in the measurement range [3].

In the present invention, the dispersion of the temperature is less than that of the related art in the broad range in each measurement range. It is also seen that the uniformity of the temperature over all the measurement ranges is higher than that of the related art.

INDUSTRIAL APPLICABILITY

As described above, according to a flowmeter of the present invention, since an auxiliary flow passageway is disposed, an averaged flow of a fluid is generated in a fluid storage portion and, thereby temperature distribution in the fluid storage portion including a flow rate measuring portion is sufficiently uniformed and accuracy of flow rate measurement is enhanced.

What is claimed is:

1. A flowmeter comprising:
   a fluid storage portion formed in a housing, the fluid storage portion being connected to a fluid inlet tube formed in the housing; and
   a flow rate measuring portion which is disposed in the fluid storage portion and in which a fluid flow passageway is formed and an outlet port of the fluid flow passageway is connected to a fluid outlet tube formed in the housing and in which a heat type flow rate sensor is disposed including a fin plate projecting into the fluid flow passageway,
   wherein an auxiliary flow passageway for leading fluid in the fluid storage portion toward an inlet port of the fluid flow passageway is formed in the flow rate measuring portion, and the auxiliary flow passageway comprises a plurality of fluid introducing ports and a fluid discharging port which is connected to the fluid introducing ports and which is positioned closer to the fluid flow passageway inlet port than to the fluid introducing ports.

2. The flowmeter according to claim 1, wherein one of the plurality of fluid introducing ports of the auxiliary flow passageway is constituted of one end opening, the other fluid introducing ports are constituted of side openings, and the fluid discharging port is constituted of the other end opening.

3. The flowmeter according to claim 2, wherein the fluid flow passageway extends in a vertical direction, the auxiliary flow passageway extends in parallel with the fluid flow passageway, and the fluid flow passageway inlet port is positioned in a lower end of the fluid flow passageway.

4. The flowmeter according to claim 1, wherein the fluid storage portion is formed of a recess portion for storage formed in a main body member of the housing and an inner lid member fitted to the recess portion, and the flow rate measuring portion is attached to the inner lid member.

5. The flowmeter according to claim 2, wherein the fluid storage portion is formed of a recess portion for storage formed in a main body member of the housing and an inner lid member fitted to the recess portion, and the flow rate measuring portion is attached to the inner lid member.

6. The flowmeter according to claim 3, wherein the fluid storage portion is formed of a recess portion for storage formed in a main body member of the housing and an inner lid member fitted to the recess portion, and the flow rate measuring portion is attached to the inner lid member.

* * * * *

UNITED STATES PATENT AND TRADEMARK OFFICE
CERTIFICATE OF CORRECTION

PATENT NO.    : 6,851,310 B2
DATED         : February 8, 2005
INVENTOR(S)   : Toshimi Nakamura et al.

It is certified that error appears in the above-identified patent and that said Letters Patent is hereby corrected as shown below:

<u>Title page,</u>
Item [86], PCT, the date should be changed from "Jun. 27, 2003" to -- Jun. 25, 2003 --.

Signed and Sealed this

Third Day of May, 2005

JON W. DUDAS
*Director of the United States Patent and Trademark Office*